June 9, 1925.
E. P. HALLIBURTON
METHOD OF AND APPARATUS FOR MIXING MATERIALS
Filed April 25, 1924
1,541,352
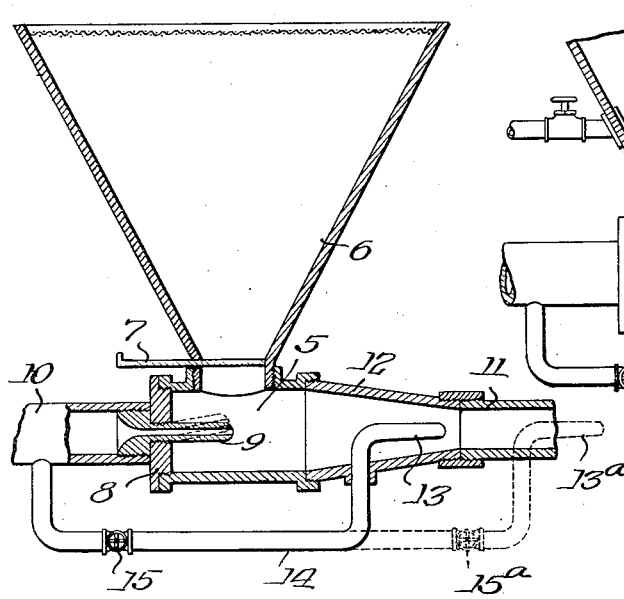
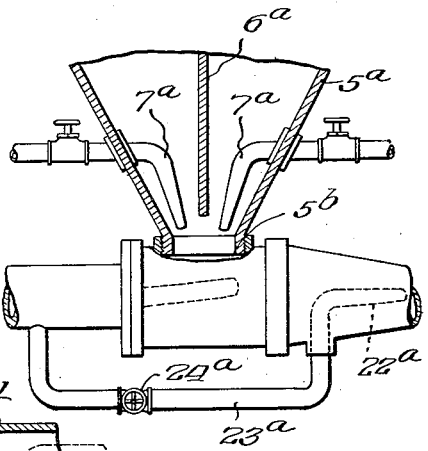
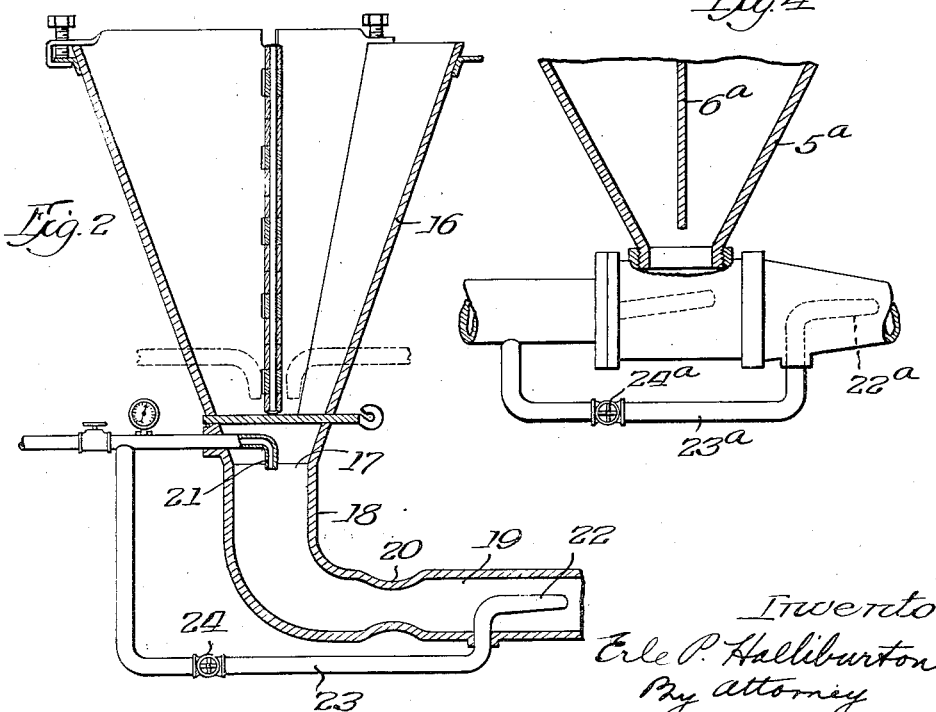
Inventor
Erle P. Halliburton
By Attorney
Brendan Patented June 9, 1925.

1,541,352

UNITED STATES PATENT OFFICE.

ERLE P. HALLIBURTON, OF DUNCAN, OKLAHOMA.

METHOD OF AND APPARATUS FOR MIXING MATERIALS.

Application filed April 25, 1924. Serial No. 708,927.

*To all whom it may concern:*

Be it known that I, ERLE P. HALLIBURTON, a citizen of the United States, and a resident of Duncan, in the county of Stephens and State of Oklahoma, have invented certain new and useful Improvements in Methods of and Apparatus for Mixing Materials, of which the following is a specification.

This invention relates broadly to mixing and more particularly to an improved method of and apparatus for producing mixtures of fluids and solids, such, for instance, as mixture of a liquid and a comminuted material, such as cement, sand, gravel and the like.

For convenience, I shall illustrate and describe my invention as adapted for producing a more or less fluent mixture of liquid (water or the like) and hydraulic cement, and for regulating the fluidity and degree of chemical association of the ingredients, but it will be understood that the invention finds a wide field of utility for other kindred purposes.

This invention is designed as a development of method of the producing fluent mixtures of cement and liquids described and claimed in my Patent #1486883 issued March 18, 1924, and the present invention has for its principal objects and advantages the provision of an improved method of producing a fluent mixture of liquid and a comminuted material subject to variation of the degree of fluidity of the mixture produced; the provision of an improved method of producing a fluid mixture of cement and a liquid characterized by variability of the fluidity of the mixture without varying the degree of mix between the ingredients; the provision of an improved method of producing a fluent mixture of cement and a liquid by a high velocity stream of such liquid and affording a step whereby the fluidity of the mixture may be varied without material variation in the degree of mix; and the provision of an improved apparatus for conveniently carrying out the method herein described.

This invention is further and more specifically characterized by the method of mixing cement and a liquid, which includes impregnation of the cement particles by the liquid to a predetermined degree, as distinguished from the purely surface moistening of the particles of cement by the methods of others known to me and the variation, to a predetermined degree, of the fluid content of the mixture without substantial variation in the degree of such impregnation, so that all the advantages of mixing by impregnation are retained; and the accomplishment of these ends, that is, (1) predetermined liquid impregnation of the cement particles, and (2) predetermined variation of the proportions of liquid and cement, without affecting the impregnation of the cement particles, by the action of liquid under high velocity and in predetermined quantity.

I provide apparatus for producing the effects herein described, several typical structural embodiments being illustrated in the accompanying drawing, in which:

Figure 1 is a vertical sectional view of a device for carrying out the method herein described;

Figure 2 is a modified form of the device especially adapted for use where two or more solids are to be mixed with liquid, and Figures 3 and 4 are further alternative forms of this device.

The method of this invention comprises chiefly the direction of a high velocity stream of liquid through a mixing chamber, preferably, though not essentially, substantially unobstructed; admission of cement in predetermined quantity to this chamber, either solely by the action of the stream, or current of liquid, or under the influence of applied pressure or gravity, or otherwise to complete the first step which is essentially the method of the aforesaid patent; and the second step of introduction of an auxiliary stream or current of liquid unto the mixture produced by the first stream, at some point in the path of travel of the mixture to its discharge point. That is, the auxiliary supply of liquid may be in the form of a stream of liquid of the same, or a greater or less, velocity or quantity than those of the main stream, and the auxiliary stream preferably is introduced at a point so located as to not affect the function of the first stream and not so close thereto as to either change the degree of impregnation or degree of mix, and at the same time to be presented to the mixture before any chemical change or "set" of the mixture has taken place.

Thus, I provide for variation in the liquid content of the mixture without sacrificing any of the advantages accruing to the employment of a high velocity stream for causing permeation or impregnation of the cement particles with liquid, which advantages are fully set forth in the patent and the application mentioned.

This arrangement has the important advantage over merely regulating the velocity of the main stream, as suggested in the aforesaid patent, or its quantity, in that, such variation must, of course, vary the degree of impregnation of the cement particles, whereas in the present invention, all of the advantages of this impregnation together with the added advantage of control of the fluidity of the mixture are attained in a simple and convenient manner and at a time prior to any chemical change or set in the mixture.

Of course, in some instances it may be desirable and is practicable to regulate the volume and velocity of both streams, or it may even be useful to employ more than two streams in both instances, and therefore I have illustrated structures for producing such predetermined relations of volume and velocity of the respective streams as conditions may demand. This increases the flexibility of the method, and enables the operator to regulate to a nicety the (1) degree of "mix" or impregnation; and (2) to regulate the fluidity or density of the mixture discharged, or both irrespective of each other.

For obtaining the best results in preparing a fluent mixture of cement and water, such, for instance, of a grout consistency, I employ a high velocity stream or current of liquid directed through a chamber having an outlet, if desired at or near the point at which the mixture is to be delivered. Into the presence of the stream of water in the chamber, either under the influence of the stream itself or by other suitable means, I introduce a predetermined quantity of cement at a predetermined rate, preferably, though not necessarily, dependent upon or proportional to the rate of flow and volume of the stream, or current so that the cement is brought into intimate contact with the stream and mixed with and by the stream. I have discovered that ordinarily the stream or current of water, due to the high velocity, apparently produces several results, namely, induction of the cement into the stream substantially proportionately to the rate of flow, discharge at substantially the same rate, accompanied by impregnation of the cement particles by the force of the stream. This impregnation or "soaking" of the cement particles is not produced by the methods of others known to me and is productive of highly desirable results in that, among others, the "set" is quicker and has less surface water or other liquid.

As it is sometimes desired to vary the ultimate consistency of the mixture, I provide an auxiliary stream or current of liquid which enters the mixture preferably immediately after its production, and this stream is also of high velocity to a degree predetermined and regulable to the conditions prevailing and the consistency of mixture desired. This auxiliary stream or current not only has the moisture additive effect without reducing the degree of impregnation of the liquid in the cement, but may, if of sufficient velocity and volume, even increase the liquid content of each particle of cement, provided that the saturation point has not already been reached by the action of the first stream.

By variation in (1) volume and rate of feed of cement, and (2) volume and rate of flow of liquid at (a) main nozzle or nozzles and at (b) auxiliary nozzle or nozzles, or all of these factors, and furthermore by production of more or less retardation of the discharge of the moisture from the mixing chamber, I am enabled to produce a mixture of, for instance, hydraulic cement and water, which while in apparently a more or less highly fluent state when discharged, possesses the highly desirable features of rapid set and increased tenacity and strength when set.

I have found that in most instances a region of suction is created in the mixing chamber by the velocity of the stream or streams passing therethrough, but it is conceivable that this region of suction might not exist where the chamber is larger, though some of the desirable features of mixing by a high velocity stream are sacrificed where the chamber is too large.

While I prefer to feed the cement by its own weight to the mixing chamber, I have conceived the employment of means for positively feeding the cement to such as, for instance, forcing the cement into contact with the stream by fluid pressure as by another stream externally of the mixing chamber.

Referring now to the drawing, and first to Figure 1, I have provided a substantially cylindrical mixing chamber 5, above which I mount a hopper 6, into which the cement is continuously dumped. The mixing chamber is provided here with an inlet 7 through which communication with the hopper is established. In this inlet, I may insert a slide valve 7, which may be employed, if desired, for constricting the inlet and regulating the volume of cement per time interval which enters the mixing chamber.

The mixing chamber is provided with a rear wall 8, through the axial center of which a nozzle 9 projects. This nozzle may be substantially on the longitudinal axis of the mixing chamber, or may be directed at a slight angle as shown in dotted lines. The nozzle might even be variable as to angularity by any convenient mechanical means.

A conduit 10 for liquid communicates with the nozzle 9 and with a source of liquid under high pressure. This liquid issues from the nozzle 9 at an extremely high velocity and is projected through the mixing chamber toward the outlet or mixture delivery section 11.

The section 11 may be separate from the mixing chamber 5 but forms a component part thereof, and is provided with the tapering cylindrical wall 12, so that slight retardation may be imposed upon the mixture. I have discovered that this constriction 12 is not absolutely essential to the attainment of satisfactory results, though it is useful.

For supplying additional liquid to the mixture I provide an auxiliary nozzle 13 which may receive a supply of liquid from another source, but which preferably receives its supply from the conduit 10 by the provision of a by-pass conduit 14 provided with a valve 15.

Ordinarily, and as shown, the conduit 14 is of less diameter than that of the conduit 10, this relationship to be determined as required, and the nozzles 9 and 13 may have openings of the same or different sizes to be determined as desired.

As shown, the auxiliary nozzle 13 is placed toward the outlet at a sufficient distance from the main mixing nozzle 9 so that the stream issuing from the nozzle 13 cannot materially affect the function of the nozzel 9.

To the right of Figure 1, in dotted lines an additional nozzle 13ᵃ is shown controlled by valve 15ᵃ, and either one or both of the nozzles 13 and 13ᵃ may be employed, thus varying as desired the linear distance between the points of contact of the cement with the main and auxiliary stream or streams.

In operation, it will be understood that the cement upon contact with the stream issuing from the main nozzle is mixed with the liquid thereof, and all the beneficial results of such mixing by a high velocity stream are attained. To vary the liquid content without varying the mix as previously explained, either one or both of the nozzles 13 or 13ᵃ may be operated.

It is also a feature of the structure shown that the auxiliary nozzles may be angularly variable similarly to the nozzle 9, so that the device provides for a wide degree of flexibility and variation of the mixture and the proportions of the ingredients of the mixture produced.

Referring now to Figure 2, I have here provided a hopper 16, having an outlet 17 to a vertical substantially cylindrical mixing chamber 18. The lower end of the mixing chamber 18 is turned laterally to form an outlet pipe 19 in which I provide a constriction 20.

A nozzle 21 is disposed at the top of the mixing chamber, preferably at substantially the center thereof, so that material, such as cement, which may be deposited in the hopper 16, will, by the action of gravity and the force of the stream of fluid downwardly directed, cause the cement to enter the mixing chamber, be mixed therein with the liquid issuing from the nozzle 21, and be discharged mixed with such liquid through the pipe 19. The constriction 20 serves to sufficiently retard discharge of the mixture so that a thorough mixing of the liquid and material is effected. It will be observed that the nozzle is placed at the junction of the hopper and mixing chamber as well as on the vertical axis of the latter, in order to prevent boiling back of the mixture due to cross eddies. However, I have found that in actual practice the nozzle may be placed at an angle to the vertical without seriously affecting the operation.

The auxiliary nozzle 22 is provided entering the mixing chamber beyond the constriction 20, and said nozzle receives liquid under pressure through conduit 23, controlled by valve 24.

The hopper 16 may be provided with the partitions, etc., as shown and described and claimed in my application Serial No. 684,379, where it is desired to mix a plurality of pulverulent materials. Auxiliary nozzles 16ᵃ—16ᵃ may be provided for cooperation with the nozzles 21 and 22.

The same general plan is adopted in Figure 3 to that shown in Figures 1 and 2, where a plurality of materials are to be mixed in a device like that of Figure 1, the hopper 5ᵃ having a partition 6ᵃ forming compartments which have outlets to the mixing chamber 5ᵇ. It will be understood that a plurality of nozzles may be employed in this form of the invention as well as in the form shown in Figure 2, the auxiliary nozzles being indicated at 7ᵃ—7ᵃ.

Referring now to Figure 4, it will be seen that this device is a combined modification of the devices of Figures 1 and 3, the structure being identical with Figure 3, with the exception that the auxiliary nozzles 7ᵃ are omitted. This form of the invention may be operated like Figure 1 and a plurality of materials introduced into the hopper and extruded and mixed with and by the streams issuing from one or both of the nozzles 22ª and 9ª. A valve 24ª controls the nozzle 22ª.

From the foregoing it will be readily appreciated that minor alterations in the system of use of the nozzles may be had, such as variation in the relationship of the pressures, positions of the nozzles and the like to suit the conditions. In this connection, one or both of the nozzles 9 or 13 or 9ª and 22ª, or 21 and 22 may be angularly variable as desired.

Having thus described my invention and illustrated its use, what I claim to be new and desire to secure by Letters Patent, is:

1. The method of mixing cement and a liquid which comprises directing a high velocity stream of liquid through a mixing chamber, introducing a quantity of cement into said chamber into contact and intimate mixture with said stream of liquid to produce the fluent mixture of cement and such liquid and directing an auxiliary high velocity stream of liquid into the mixture for varying the consistency thereof without affecting the effectiveness of the initial mixing.

2. The method of producing a mixture of cement and a liquid, which comprises entraining the cement in a high velocity stream of such liquid in a mixing chamber to produce an impregnation of the particles of cement, and varying the proportions of liquid and cement without reducing such impregnation.

3. The method of mixing cement and a liquid which comprises directing a high velocity stream of such liquid through a substantially uninterrupted mixing chamber, introducing cement into said mixing chamber into intimate contact with said stream of liquid, and directing an auxiliary supply of liquid between the point at which such cement enters and the discharge of the mixture.

4. The method of mixing cement and a liquid which comprises directing a high velocity stream of such liquid through a substantially uninterrupted mixing chamber, introducing cement into said mixing chamber into intimate contact with said stream of liquid, and directing an auxiliary supply of liquid into said chamber and into the mixture.

5. A mixing device comprising an upright substantially cylindrical mixing chamber, a lateral outlet conduit having therein a constricted zone, means for introducing a jet of liquid at high velocity into said upright mixing chamber, such introduction being in the direction of flow of the mass at the point of such introduction, means for delivering solid pulverulent material directly into said mixing chamber, and means for directing an auxiliary stream of liquid into the mixture.

6. A cement grout mixer comprising an upright substantially cylindrical mixing chamber, a nozzle projecting downwardly into the upper end of said mixing chamber, a hopper surmounting said mixing chamber and opening directly thereinto, a lateral outlet conduit connected to the bottom of said mixing chamber, and an auxiliary nozzle in said lateral outlet adjacent to said constriction.

7. A cement grout mixer comprising an upright substantially cylindrical mixing chamber, a nozzle projecting downwardly into the upper end of said mixing chamber, a hopper surmounting said mixing chamber and opening directly thereinto, a lateral outlet conduit connected to the bottom of said mixing chamber, and an auxiliary nozzle in said mixing chamber.

8. The method of producing a fluent mixture of cement and a liquid which includes impregnation of the cement particles only by a high velocity stream of such liquid in a substantially uninterrupted mixing chamber, and varying the proportions of the ingredients while maintaining a substantially constant degree of impregnation.

9. The method of continuously mixing cement and a liquid, which comprises substantially continuously directing a high velocity stream of liquid through a mixing chamber, substantially continuously introducing a quantity of cement into said chamber into contact and intimate mixture with said stream of liquid to produce the fluent mixture of cement and such liquid and directing a second stream of liquid into the mixture produced by the first stream.

10. The method of continuously mixing cement and a liquid, which comprises substantially continuously directing a high velocity stream of liquid through a mixing chamber, substantially continuously introducing a quantity of cement into said chamber into contact and intimate mixture with said stream of liquid to produce the fluent mixture of cement and such liquid and prior to discharge of the mixture directing an auxiliary stream of liquid into the mixture.

11. The method of producing a mixture of cement and a liquid, which comprises introducing the cement into a high velocity stream of such liquid in a mixing chamber for causing impregnation of the cement particles by the liquid, and introducing additional liquid into the mixture in such mixing chamber before chemical change takes place.

12. The method of producing a mixture of cement and a liquid, which comprises introducing the cement into a high velocity stream of such liquid for causing impregnation of the cement particles by the liquid, and introducing additional liquid into the mixture while yet subject to the action of said high velocity stream of liquid for changing only the proportions of the ingredients thereof.

13. The method of mixing cement and a liquid which comprises directing a high velocity stream of such liquid through a substantially uninterrupted mixing chamber, introducing cement into said mixing chamber into intimate contact with said stream of liquid, and introducing into said chamber and its contents an auxiliary high velocity stream of liquid of less volume than the first mentioned stream.

14. In a device of the character described, in combination, a mixing chamber having an inlet and an outlet and a constricted portion therebetween, a main nozzle projecting substantially centrally into said chamber adjacent to said inlet, and an auxiliary nozzle projecting into said chamber adjacent to said constriction.

15. In a device of the character described, in combination, a mixing chamber having an inlet and an outlet and a constricted portion therebetween, a main nozzle projecting substantially centrally into said chamber adjacent to said inlet, an auxiliary nozzle projecting into said chamber adjacent to said constriction, and means for varying the relative effectual action of said nozzles.

In testimony whereof I have hereunto signed my name in the presence of the two subscribed witnesses.

ERLE P. HALLIBURTON.

Witnesses:
L. L. HUMPHREYS,
M. M. MEEK.